United States Patent
Smith

(10) Patent No.: US 12,103,601 B2
(45) Date of Patent: Oct. 1, 2024

(54) SEMI-TRAILER AERODYNAMIC DRAG DEFLECTION ASSEMBLY

(71) Applicant: Bryan Smith, Katy, TX (US)

(72) Inventor: Bryan Smith, Katy, TX (US)

(*) Notice: Subject to any disclaimer, the term of this patent is extended or adjusted under 35 U.S.C. 154(b) by 268 days.

(21) Appl. No.: 17/846,226

(22) Filed: Jun. 22, 2022

(65) Prior Publication Data

US 2023/0415825 A1    Dec. 28, 2023

(51) Int. Cl.
*B62D 35/00* (2006.01)
*B60R 9/05* (2006.01)
*B62D 35/02* (2006.01)
*B62D 37/02* (2006.01)

(52) U.S. Cl.
CPC .............. *B62D 35/001* (2013.01); *B60R 9/05* (2013.01); *B62D 35/02* (2013.01); *B62D 37/02* (2013.01)

(58) Field of Classification Search
CPC .... B62D 35/001; B62D 35/008; B62D 35/02; B62D 37/02; B60R 9/00; B60R 9/05
USPC .............................. 296/37.1, 37.6, 180.1, 0.4
See application file for complete search history.

(56) References Cited

U.S. PATENT DOCUMENTS

| | | | |
|---|---|---|---|
| 2,514,695 A * | 7/1950 | Dempsey | B62D 35/001 298/1 H |
| D375,470 S | 11/1996 | Adams | |
| 8,196,996 B1 | 6/2012 | Campbell | |
| 8,303,025 B2 | 11/2012 | Senatro | |
| 9,139,238 B2 | 9/2015 | Visser | |
| 10,556,629 B2 | 2/2020 | Magee | |
| 10,745,066 B2 * | 8/2020 | Prakash | B62D 35/001 |
| 10,843,746 B1 | 11/2020 | Stinchcomb | |
| 2021/0188373 A1 | 6/2021 | Chung | |

FOREIGN PATENT DOCUMENTS

WO    WO2020181239    9/2020

* cited by examiner

*Primary Examiner* — Dennis H Pedder

(57) ABSTRACT

A semi-trailer aerodynamic drag deflection assembly for reducing aerodynamic drag upon all surfaces of the semi-trailer includes a pair of interior walls positioned against a respective one of a pair of lateral surfaces of a semi-trailer. A plurality of vents is positioned from an inner surface to an outer surface of the interior wall. A pair of exterior walls is positioned against a respective one of the pair of interior walls. An outside surface of each of the exterior walls has a plurality of indents for deflecting wind An undercarriage has a pair of side walls with a storage being positioned between each of the side walls. Each of the side walls has a plurality of fins directing aerodynamic drag from the bottom surface of the semi-trailer into each of the vents of each of the interior walls. A pair of doors provides access to the storage of the undercarriage.

13 Claims, 7 Drawing Sheets

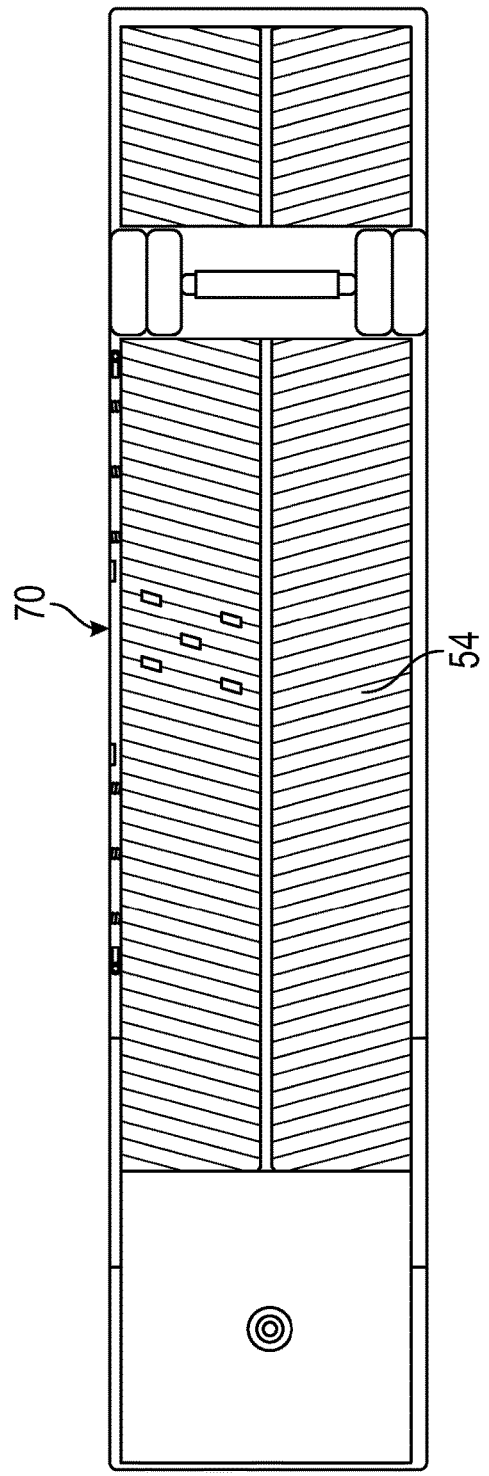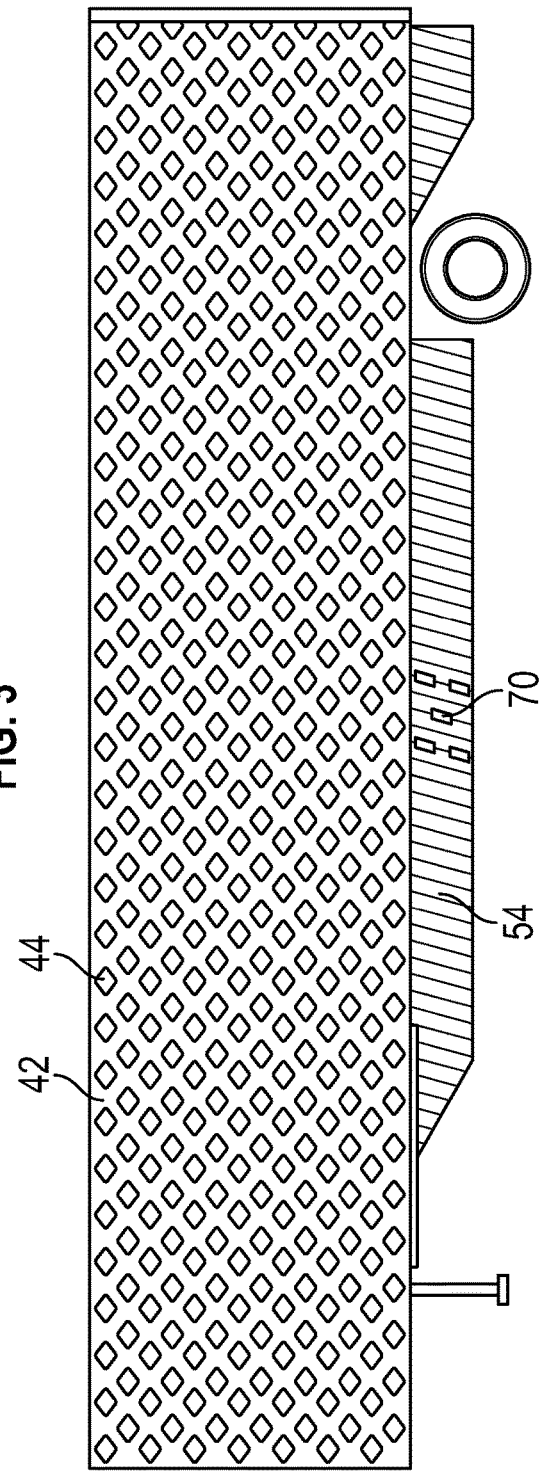

SEMI-TRAILER AERODYNAMIC DRAG DEFLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to aerodynamic trailer device and more particularly pertains to a new aerodynamic trailer device for reducing aerodynamic drag upon all surfaces of the semi-trailer.

(2) Description of Related Art Including Information Disclosed Under 37 CFR 1.97 and 1.98

The prior art relates to aerodynamic trailer devices. The prior art relates to a variety of aerodynamic trailer devices configured for reducing aerodynamic drag upon a semi-trailer being towed by a semi-trailer truck. Known prior art lacks an aerodynamic trailer device configured for reducing aerodynamic drag upon the pair of lateral surfaces and the top and bottom surfaces while also providing storage in an undercarriage.

BRIEF SUMMARY OF THE INVENTION

An embodiment of the disclosure meets the needs presented above by generally comprising a pair of interior walls being configured for being positioned against a respective one of a pair of lateral surfaces of a semi-trailer. Each of the interior walls has an inner surface and an outer surface. A plurality of vents is positioned from the inner surface to the outer surface of the interior wall. A pair of exterior walls is positioned against a respective one of the pair of interior walls. Each of the exterior walls has an inside surface and an outside surface. The outside surface of each of the exterior walls has a plurality of indents. Each of the indents has a geometrical shape configured for deflecting wind upon the outside surface of each of the exterior walls. An undercarriage is positioned against the bottom surface of the semi-trailer. The undercarriage has a pair of side walls. A storage is positioned between each of the side walls and the bottom surface of the semi-trailer. Each of the side walls has a plurality of fins being configured for directing aerodynamic drag from the bottom surface of the semi-trailer into each of the vents of each of the interior walls. A pair of doors is positioned upon a first side wall of the pair of side walls of the undercarriage. The pair of doors is configured for providing access to the storage of the undercarriage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a bottom view of an embodiment of the disclosure.

FIG. 4 is a side view with exterior wall of an embodiment of the disclosure.

DETAILED DESCRIPTION OF THE INVENTION

Figure 1:
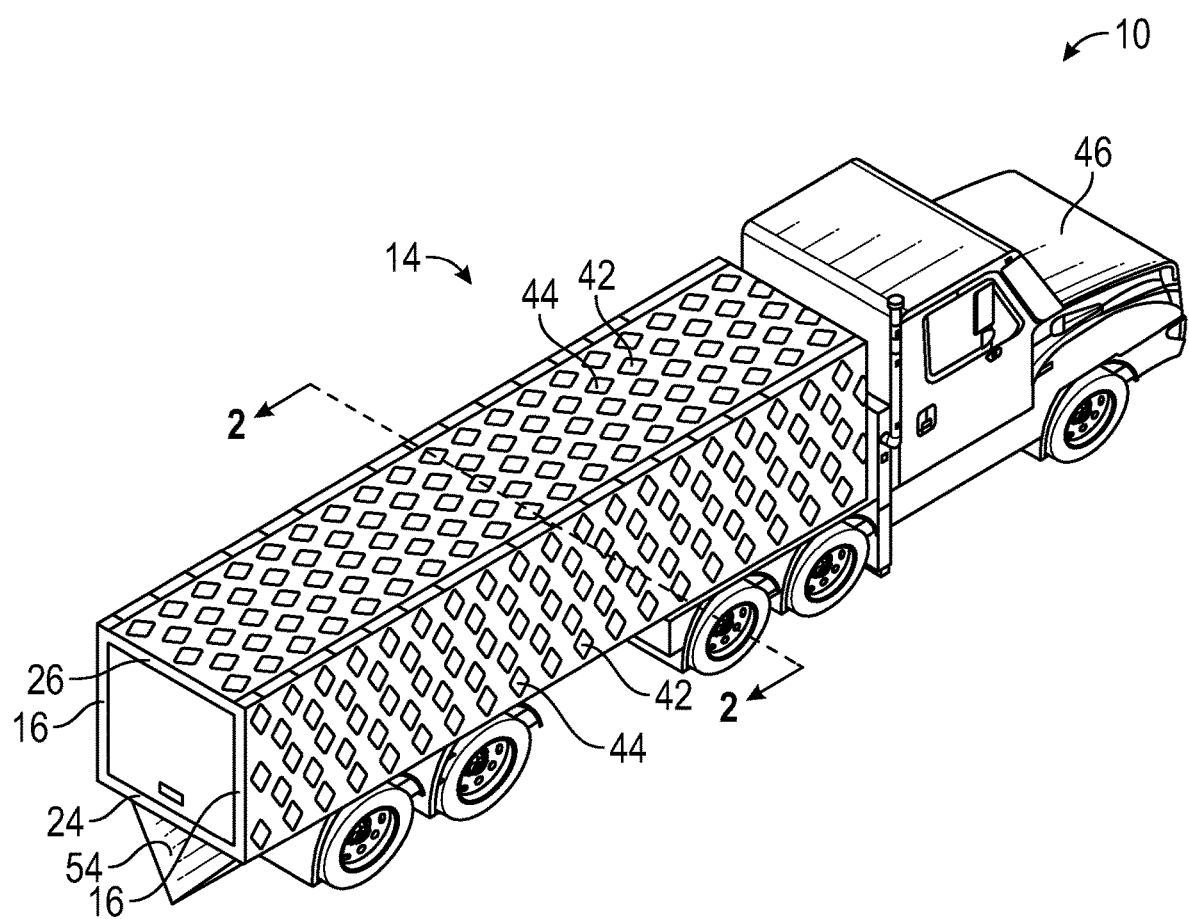
FIG. 1 is a top isometric view of a semi-trailer aerodynamic drag deflection assembly according to an embodiment of the disclosure.
Figure 2:
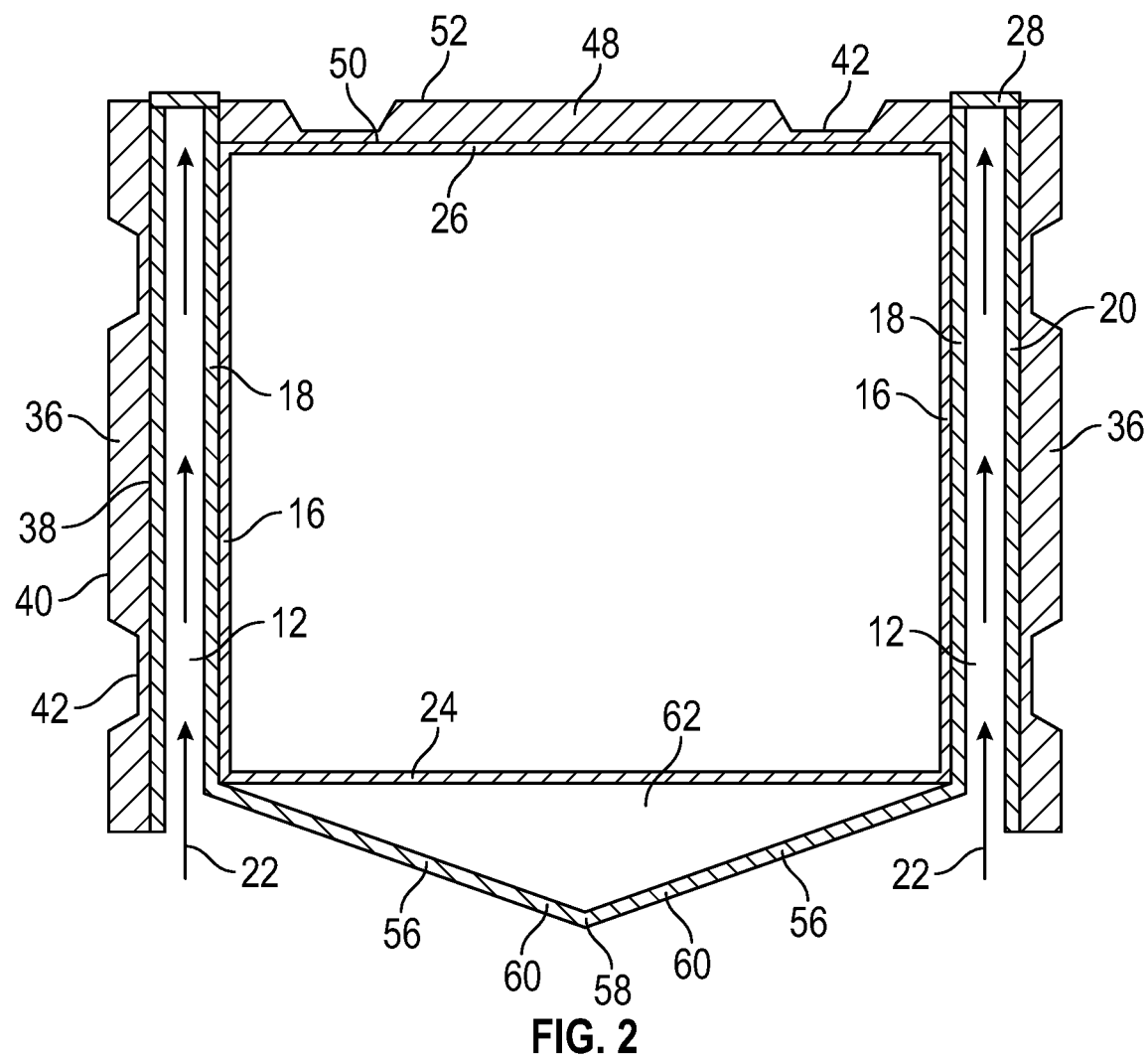
FIG. 2 is a cross-sectional view of an embodiment of the disclosure taken from FIG. 1 of Line 2-2.
Figure 5:
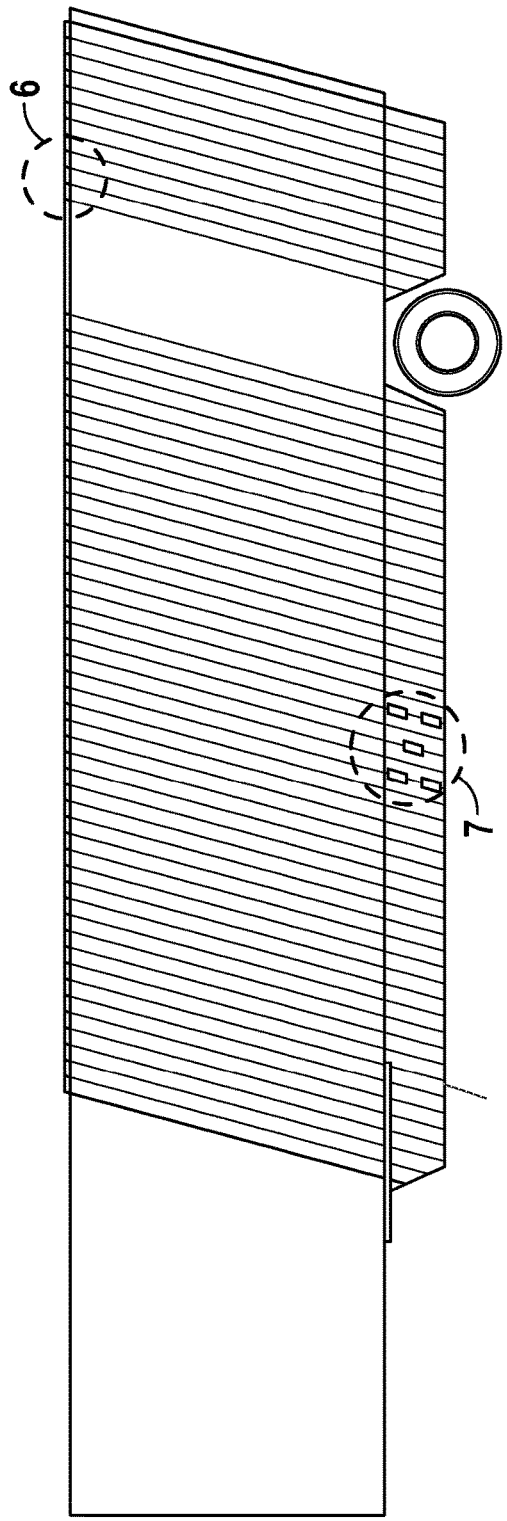
FIG. 5 is a side view without exterior wall of an embodiment of the disclosure.
Figure 6:
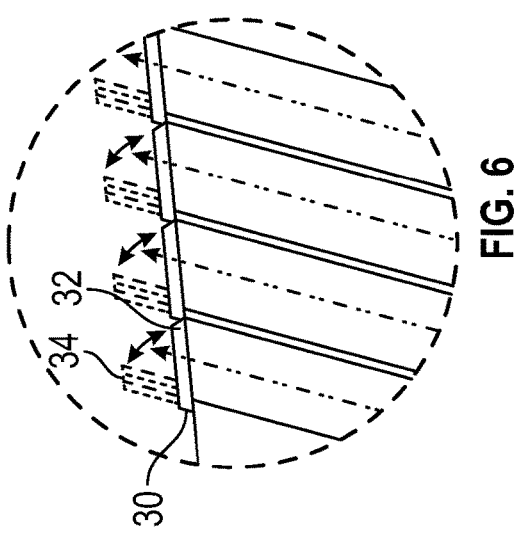
FIG. 6 is a detail view of an embodiment of the disclosure taken from FIG. 5 of Circular Boundary 6.
Figure 7:
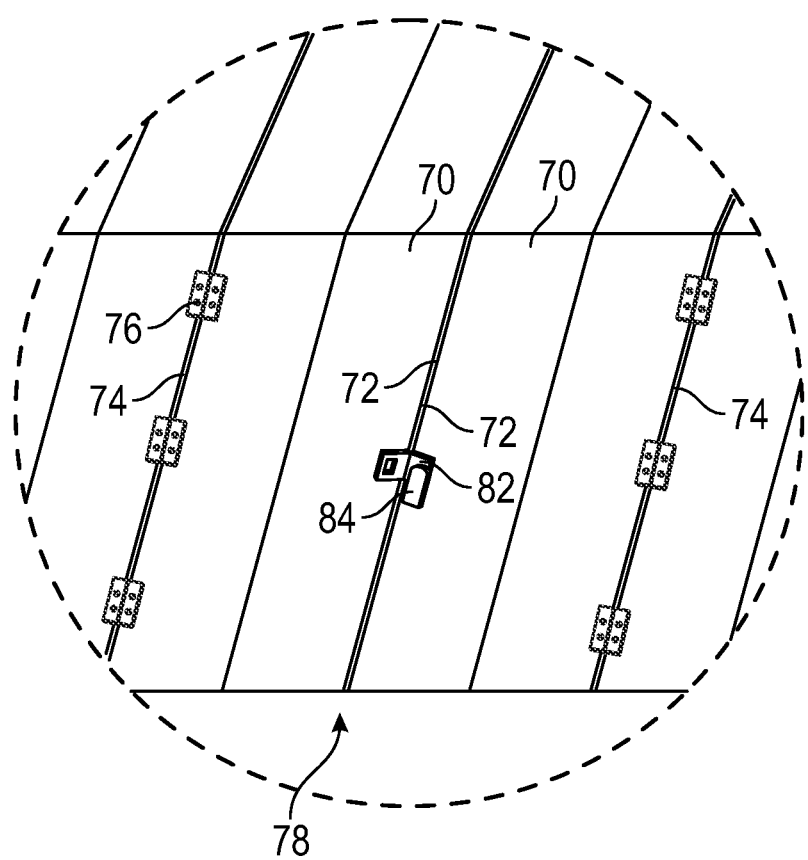
FIG. 7 is a detail view of an embodiment of the disclosure taken from FIG. 5 of Circular Boundary 7.
Figure 8:
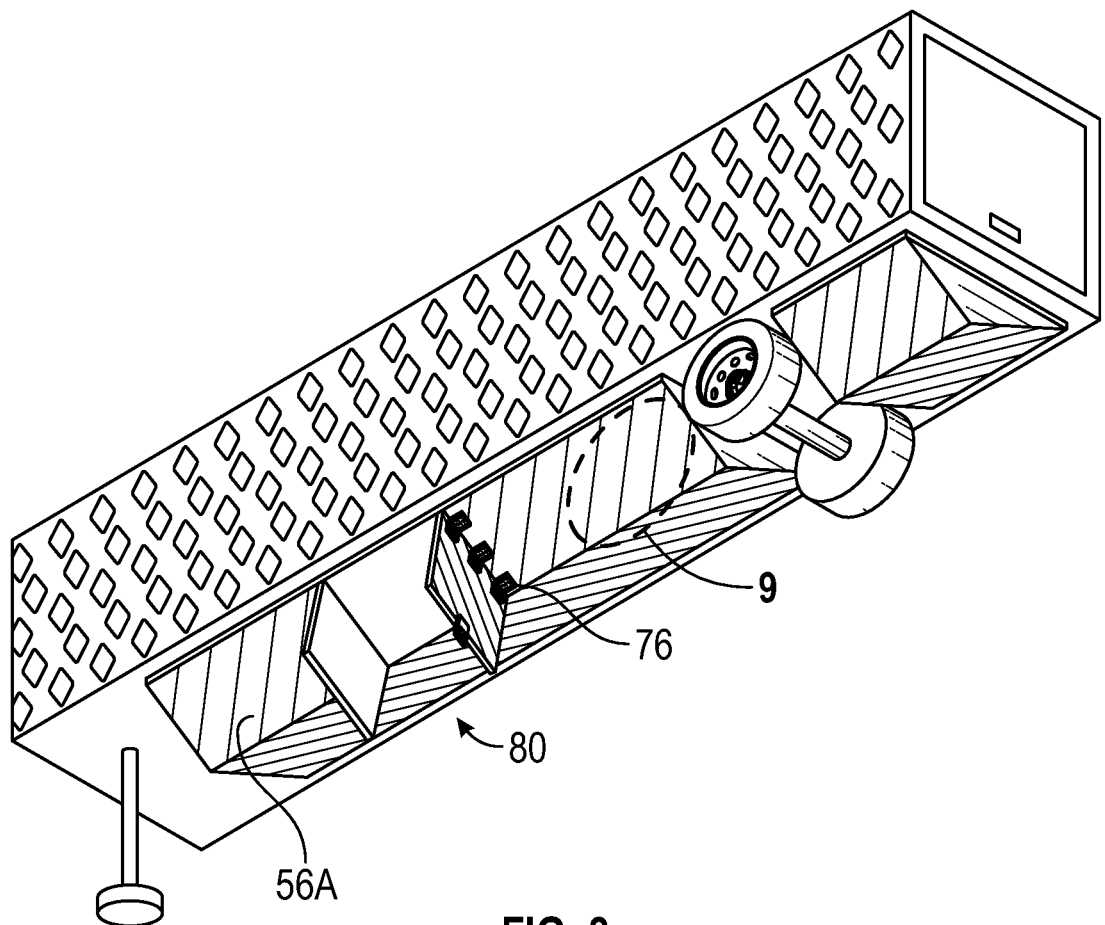
FIG. 8 is a bottom isometric view of an embodiment of the disclosure.
Figure 9:
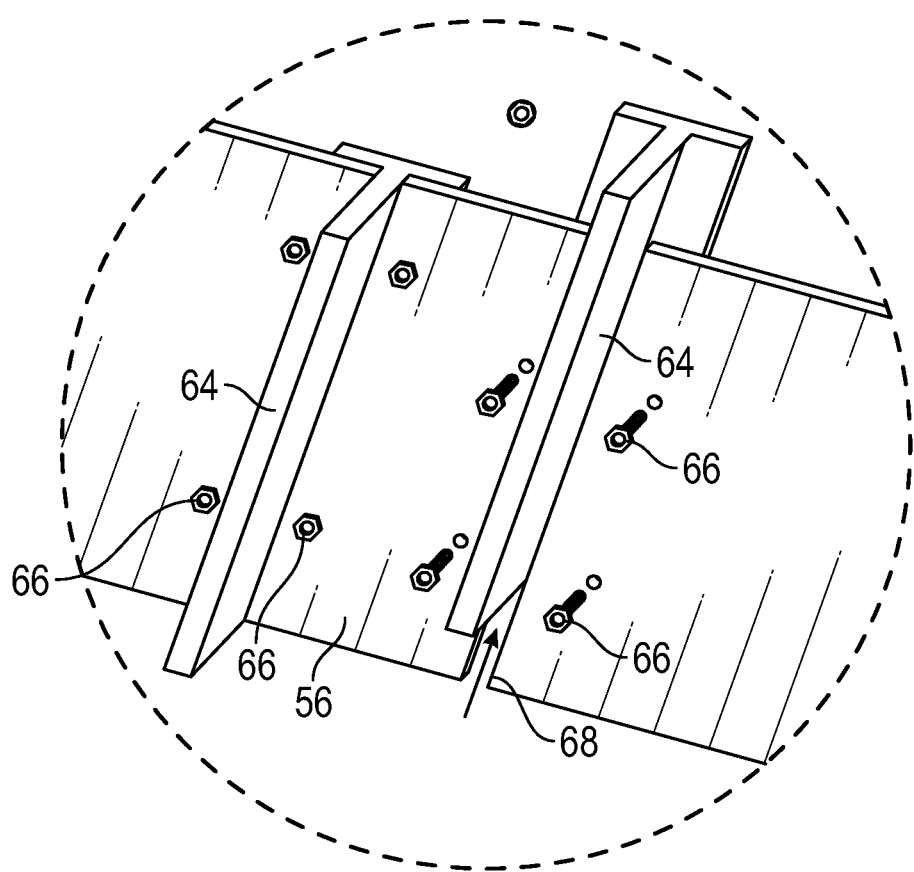
FIG. 9 is a detail view of an embodiment of the disclosure taken from FIG. 8 of Circular Boundary 9.

With reference now to the drawings, and in particular to FIGS. 1 through 9 thereof, a new aerodynamic trailer device embodying the principles and concepts of an embodiment of the disclosure and generally designated by the reference numeral 10 will be described.

As best illustrated in FIGS. 1 through 9, the semi-trailer aerodynamic drag deflection assembly 10 generally comprises a pair of interior walls 12. The pair of interior walls 12 is configured for being positioned against a respective one of a pair of lateral surfaces 16 of a semi-trailer 14. Each of the interior walls 12 has an inner surface 18 and an outer surface 20. The inner surface 18 of each of the interior walls 12 is adhesively coupled to a respective one of each of the lateral surfaces 16 of the semi-trailer 14. A plurality of vents 22 is positioned from the inner surface 18 to the outer surface 20 of each of the interior walls 12. Each of the vents 22 is a conduit being configured for being positioned from a bottom surface 24 of the semi-trailer 14 to a top surface 26 of the semi-trailer 14. Each of the vents 22 has a flap 28 positioned at the top surface 26 of the semi-trailer 14. The flap 28 of each of vents 22 is coupled by a hinge 30. The hinge 30 of each of the vents 22 is configured for positioning the flap 28 from a closed 32 to an open 34 position relative to each of the vents 22. The flap 28 is biased towards a closed position 32. As aerodynamic drag travels from the bottom surface 24 of the semi-trailer 14 to the top surface 26 of the semi-trailer 14 through each of the vents 22, the flap 28 of each of the vents 22 opens to expel the aerodynamic drag.

A pair of exterior walls 36 is positioned against a respective one of the pair of interior walls 12. Each of the exterior walls 36 has an inside surface 38 and an outside surface 40. The inside surface 38 of each of the exterior walls 36 is adhesively coupled to a respective one of the outer surface 20 of each of the interior walls 12. The outside surface 40 of each of the exterior walls 36 has a plurality of indents 42. Each of the indents 42 has a geometrical shape configured for deflecting aerodynamic drag upon the outside surface 40 of each of the exterior walls 36. The plurality of indents 42 is in an arrangement 44 upon the outside surface 40 of each of the exterior walls 36. The arrangement 44 is configured for optimizing the deflection of aerodynamic drag upon the outside surface 40 of each of the exterior walls 36 wherein stabilizing the semi-trailer 14 being towed by a semi-trailer truck 46.

A top wall 48 is positioned upon the top surface 26 of the semi-trailer 14. The top wall 48 has an internal surface 50 and an external surface 52. The internal surface 50 of the top wall 48 is adhesively coupled to the top surface 26 of the semi-trailer 14. The external surface 52 of the top wall 48 has the plurality of indents 42 of the pair of exterior walls 36. The plurality of indents 42 of the external surface 52 of the top wall 48 is positioned in the arrangement 44 wherein the plurality of indents 42 of the top wall 48 is configured for deflecting aerodynamic drag upon the top surface 26 of the semi-trailer 14.

An undercarriage 54 is positioned against the bottom surface 24 of the semi-trailer 14. The undercarriage 54 has a pair of side walls 56. Each of the side walls 56 protrudes out from the bottom surface 24 of the semi-trailer 14 towards a junction 58. The junction 58 is a coupling of an end 60 of each of the side walls 56. The positioning of the pair of side walls 56 relative to the junction 58 defines a triangular shape of the undercarriage 54. A storage 62 is positioned between each of the side walls 56 and the bottom surface 24 of the semi-trailer 14. The storage 62 defines a space for a variety of items to be positioned within. Furthermore, each of the side walls 56 has a plurality of fins 64. Each of the fins 64 is coupled to each of the side walls 56 by a plurality of bolts 66. Each of the fins 64 is nested within a slot 68 upon each of the side walls 56. Each of the fins 64 is configured for directing aerodynamic drag from the bottom surface 24 of the semi-trailer 14 into each of the vents 22 of each of the interior walls 12.

A pair of doors 70 is positioned upon a first side wall 56A of the pair of side walls 56 of the undercarriage 54. Each of the doors 70 has a first edge 72 and a second edge 74. The second edge 74 of each of the doors 70 is coupled to the first side 56A wall by a plurality of hinges 76. The plurality of hinges 76 of each of the doors 70 is configured for positioning each of the doors 70 from a closed positioned 78 to an open position 80. The closed positioned 78 of the pair of doors 70 is configured for the first edge 72 of each of the doors 70 being positioned abutting each other. The first edge 72 of each of the doors has a latch locking fastener 82 configured for retaining the pair of doors 70 in a locked position by a lock 84. The pair of doors 70 is configured for providing access to the storage 62 of the undercarriage 54.

In use, the semi-trailer truck 46 tows the semi-trailer 14. As aerodynamic drag engages with each of the lateral surfaces 16 and the top surface 26 of the semi-trailer 14, the plurality of indents 42 of the pair of exterior walls 36 and the top wall 48 deflect the aerodynamic drag wherein stabilizing the semi-trailer 14 relative to the semi-trailer truck 46. The undercarriage 54 of the semi-trailer 14 directs the aerodynamic drag from the bottom surface 24 into each of the vents 22 of each of the interior walls 12 to dispel the aerodynamic drag out from the flap 28 of each of the vents 22 of the top surface 26 of the semi-trailer 14. Additionally, a variety of items can be stored within the storage 62 of the undercarriage 54. The pair of doors 70 of the storage 62 is sealed in a closed position 78 by the use of the latch locking fastener 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A storage semi-trailer assembly configured for deflecting aerodynamic drag upon a surface of the storage semi-trailer being towed by a semi-trailer truck, the storage semi-trailer assembly comprising:

a pair of interior walls being configured for being positioned against a respective one of a pair of lateral surfaces of a semi-trailer, each of said interior walls having an inner surface and an outer surface, a plurality of vents being positioned from said inner surface to said outer surface of each of said interior walls;

a pair of exterior walls being positioned against a respective one of said pair of interior walls, each of said exterior walls having an inside surface and an outside surface, said outside surface of each of said exterior walls having a plurality of indents, each of said indents having a geometrical shape configured for deflecting aerodynamic drag upon said outside surface of each of said exterior walls;

an undercarriage being positioned against the bottom surface of the semi-trailer, said undercarriage having a pair of side walls, a storage being positioned between each of said side walls and the bottom surface of the semi-trailer, each of said side walls having a plurality of fins, each of said fins being configured for directing aerodynamic drag from the bottom surface of the semi-trailer into each of said vents of each of said interior walls; and
a pair of doors being positioned upon a first side wall of said pair of side walls of said undercarriage, said pair of doors being configured for providing access to said storage of said undercarriage.

2. The storage semi-trailer assembly of claim 1, further comprising said inner surface of each of said interior walls being adhesively coupled to a respective one of each of the lateral surfaces of the semi-trailer.

3. The storage semi-trailer assembly of claim 2, further comprising each of said vents being a conduit, each of said vents being configured for being positioned from a bottom surface of the semi-trailer to a top surface of the semi-trailer.

4. The storage semi-trailer assembly of claim 1, further comprising each of said vents having a flap positioned at the top surface of the semi-trailer, said flap of each of vents being coupled by a hinge, said hinge of each of said vents being configured for positioning said flap from a closed to an open position relative to each of the vents, said flap being biased towards a closed position.

5. The storage semi-trailer assembly of claim 1, further comprising said inside surface of each of said exterior walls being adhesively coupled to a respective one of said outer surface of each of said interior walls.

6. The storage semi-trailer assembly of claim 1, further comprising said plurality of indents being in an arrangement upon said outside surface of each of said exterior walls, said arrangement being configured for optimizing the deflection of aerodynamic drag upon said outside surface of each of said exterior walls wherein stabilizing the semi-trailer being towed by a semi-trailer truck.

7. The storage semi-trailer assembly of claim 3, further comprising a top wall being positioned upon the top surface of the semi-trailer, said top wall having an internal surface and an external surface, said internal surface of said top wall being adhesively coupled to the top surface of the semi-trailer.

8. The storage semi-trailer assembly of claim 7, further comprising said external surface of said top wall having said plurality of indents, said plurality of indents of said external surface of said top wall being positioned in said arrangement, said plurality of indents of said top wall being configured for deflecting aerodynamic drag upon the top surface of the semi-trailer.

9. The storage semi-trailer assembly of claim 1, further comprising each of said side walls protruding out from said bottom surface towards a junction, said junction being a coupling of an end of each of said side walls, said pair of side walls positioning relative to said junction defining a triangular shape of the undercarriage.

10. The storage semi-trailer assembly of claim 1, further said storage defining a space for a variety of items to be positioned within.

11. The storage semi-trailer assembly of claim 9, further comprising each of said fins being coupled to each of said side walls by a plurality of bolts.

12. The storage semi-trailer assembly of claim 11, further comprising each of said doors having a first edge and a second edge, said second edge of each of said doors being coupled to said first side wall by a plurality of hinges, said plurality of hinges of each of said doors being configured for positioning each of said doors from a closed positioned to an open position, said closed positioned of said pair of doors being configured for said first edge of each of said doors being positioned abutting each other, said first edge of each of said doors having a latch locking fastener configured for retaining said pair of doors in a locked position by a lock.

13. A storage semi-trailer assembly configured for deflecting aerodynamic drag upon a surface of the storage semi-trailer being towed by a semi-trailer truck, the storage semi-trailer assembly comprising:
a pair of interior walls being configured for being positioned against a respective one of a pair of lateral surfaces of a semi-trailer, each of said interior walls having an inner surface and an outer surface, said inner surface of each of said interior walls being adhesively coupled to a respective one of each of the lateral surfaces of the semi-trailer, a plurality of vents being positioned from said inner surface to said outer surface of each of said interior walls, each of said vents being a conduit, each of said vents being configured for being positioned from a bottom surface of the semi-trailer to a top surface of the semi-trailer, each of said vents having a flap positioned at the top surface of the semi-trailer, said flap of each of vents being coupled by a hinge, said hinge of each of said vents being configured for positioning said flap from a closed to an open position relative to each of the vents, said flap being biased towards a closed position;
a pair of exterior walls being positioned against a respective one of said pair of interior walls, each of said exterior walls having an inside surface and an outside surface, said inside surface of each of said exterior walls being adhesively coupled to a respective one of said outer surface of each of said interior walls, said outside surface of each of said exterior walls having a plurality of indents, each of said indents having a geometrical shape configured for deflecting aerodynamic drag upon said outside surface of each of said exterior walls, said plurality of indents being in an arrangement upon said outside surface of each of said exterior walls, said arrangement being configured for optimizing the deflection of aerodynamic drag upon said outside surface of each of said exterior walls wherein stabilizing the semi-trailer being towed by a semi-trailer truck;
a top wall being positioned upon the top surface of the semi-trailer, said top wall having an internal surface and an external surface, said internal surface of said top wall being adhesively coupled to the top surface of the semi-trailer, said external surface of said top wall having said plurality of indents, said plurality of indents of said external surface of said top wall being positioned in said arrangement, said plurality of indents of said top wall being configured for deflecting aerodynamic drag upon the top surface of the semi-trailer;
an undercarriage being positioned against the bottom surface of the semi-trailer, said undercarriage having a pair of side walls, each of said side walls protruding out from said bottom surface towards a junction, said junction being a coupling of an end of each of said side walls, said pair of side walls positioning relative to said junction defining a triangular shape of the undercarriage, a storage being positioned between each of said side walls and the bottom surface of the semi-trailer, said storage defining a space for a variety of items to be positioned within, each of said side walls having a plurality of fins, each of said fins being coupled to each of said side walls by a plurality of bolts, each of said fins being configured for directing aerodynamic drag from the bottom surface of the semi-trailer into each of said vents of each of said interior walls; and a pair of doors being positioned upon a first side wall of said pair of side walls of said undercarriage, each of said doors having a first edge and a second edge, said second edge of each of said doors being coupled to said first side wall by a plurality of hinges, said plurality of hinges of each of said doors being configured for positioning each of said doors from a closed positioned to an open position, said closed positioned of said pair of doors being configured for said first edge of each of said doors being positioned abutting each other, said first edge of each of said doors having a latch locking fastener configured for retaining said pair of doors in a locked position by a lock, said pair of doors being configured for providing access to said storage of said undercarriage.

* * * * *